(12) United States Patent
Yoon et al.

(10) Patent No.: US 7,710,893 B2
(45) Date of Patent: May 4, 2010

(54) METHOD OF REDUCING SIGNALLING OVERHEAD AND POWER CONSUMPTION IN A WIRELESS COMMUNICATION SYSTEM

(75) Inventors: Young C. Yoon, San Diego, CA (US); Li-Hsiang Sun, San Diego, CA (US); Sang Gook Kim, San Diego, CA (US); Suk Woo Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 713 days.

(21) Appl. No.: 11/534,084

(22) Filed: Sep. 21, 2006

(65) Prior Publication Data

US 2007/0091817 A1    Apr. 26, 2007

Related U.S. Application Data

(60) Provisional application No. 60/719,361, filed on Sep. 21, 2005, provisional application No. 60/721,312, filed on Sep. 27, 2005.

(51) Int. Cl.
    *H04J 1/16* (2006.01)
(52) U.S. Cl. .......................... 370/252; 370/338; 455/69
(58) Field of Classification Search ......... 370/229–235, 370/241–253, 338, 412
    See application file for complete search history.

(56) References Cited

U.S. PATENT DOCUMENTS

| 2003/0087605 | A1  | 5/2003  | Das et al. |
| 2003/0157953 | A1  | 8/2003  | Das et al. |
| 2004/0141530 | A1* | 7/2004  | Spio ........................... 370/535 |
| 2004/0228294 | A1* | 11/2004 | Kim et al. ................... 370/312 |
| 2005/0036475 | A1* | 2/2005  | Nishiyama et al. .......... 370/347 |
| 2005/0289256 | A1* | 12/2005 | Cudak et al. .................. 710/62 |
| 2006/0013182 | A1* | 1/2006  | Balasubramanian et al. 370/343 |
| 2007/0143598 | A1* | 6/2007  | Partridge et al. ............ 713/160 |

FOREIGN PATENT DOCUMENTS

| EP | 1 309 121 B1 | 9/2004 |
| WO | WO 2004-098072 A2 | 11/2004 |

* cited by examiner

*Primary Examiner*—Ricky Ngo
*Assistant Examiner*—Kan Yuen
(74) *Attorney, Agent, or Firm*—Lee, Hong, Degerman, Kang & Waimey

(57) ABSTRACT

A method of transmitting channel quality information (CQI) to an access network (AN) in a system having at least one carrier is disclosed. More specifically, the method includes receiving at least one packet from the AN, each of which includes an indicator, wherein the indicator provides buffer level information and ceasing transmission of the CQI of at least one non-anchor carrier to the AN if the buffer level information indicates that there is no more packet to be transmitted to an access terminal (AT).

17 Claims, 5 Drawing Sheets

Reserved MAC index

Indicating if it is a last packet

Legacy AT thinks it is part of pad

METHOD OF REDUCING SIGNALLING OVERHEAD AND POWER CONSUMPTION IN A WIRELESS COMMUNICATION SYSTEM

This application claims the benefit of U.S. Provisional Application No. 60/719,361, filed on Sep. 21, 2005, and U.S. Provisional Application No. 60/721,312, filed on Sep. 27, 2005, which are hereby incorporated by reference.

BACKGROUND OF THE INVENTION

1. Field of the Invention

The present invention relates to a method of reducing signaling overhead, and more particularly, to a method of reducing signaling overhead and power consumption in a wireless communication system.

2. Discussion of the Related Art

In a multiple access communication system, communications between users are conducted through one or more base stations, also referred to as an access network (AN). Here, multiple access refers to simultaneous transmission and/or reception. Several multiple access techniques are known in the art, such as time division multiple access (TDMA), frequency division multiple access (FDMA), amplitude modulation multiple access and code division multiple access (CDMA).

In general, multiple access communication system can be wireless or wired and can carry voice and/or data. An example of a communication system carrying both voice and data is a system (e.g., CDMA2000) in accordance with the IS-95 standard and a system conforming to the $3^{rd}$ Generation Partnership Project 2 (3GPP2).

As a part of CDMA2000 digital wireless standards 1xEV-DO stands for 1x Evolution Data Only or 1x Evolution Data Optimized. 1xEV-DO provides significantly faster data rates with air interface speeds of up to 4.9152 Mbps in a forward direction and up to 1.8432 Mbps in a reverse direction. 1xEV-DO Revision 0 only address data—not voice, but now, 1xEV-DO Revision A and B can support voice. A system structure of 1xEV-DO is illustrated in FIG. 1. Further, FIGS. 2 and 3 illustrate 1xEV-DO default protocol architecture, and 1xEV-DO non-default protocol architecture, respectively.

In the conventional system, signals that make up overhead are transmitted and received on a regular basis. By reducing unnecessary signals, the system can operate more efficiently, resulting in lower power consumption at each terminal.

SUMMARY OF THE INVENTION

Accordingly, the present invention is directed to a method of reducing signaling overhead and power consumption in a wireless communication system that substantially obviates one or more problems due to limitations and disadvantages of the related art.

An object of the present invention is to provide a method of transmitting a channel quality information (CQI) to an access network (AN) in a multi-carrier system.

Another object of the present invention is to provide a method of transmitting information to an access network (AN) in a multi-carrier system.

A further object of the present invention is to provide a method of transmitting packet in a multi-carrier system having at least one non-anchor carrier, each of which has ceased transmitting channel quality information (CQI).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting channel quality information (CQI) to an access network (AN) in a multi-carrier system includes receiving at least one packet from the AN, each of which includes an indicator, wherein the indicator provides buffer level information and ceasing transmission of the CQI of at least one non-anchor carrier to the AN if the buffer level information indicates that there is no more packet to be transmitted to an access terminal (AT).

In another aspect of the present invention, a method of transmitting information to an access network (AN) in a multi-carrier system includes transmitting an acknowledgement (ACK) signal to a received packet from the AN, activating a timer upon transmitting the ACK signal to the AN, and ceasing transmission of a channel quality information (CQI) of at least one non-anchor carrier if the timer expires.

In further aspect of the present invention, a method of transmitting packet in a multi-carrier system having at least one non-anchor carrier, each of which has ceased transmitting channel quality information (CQI) includes if at least one packet is buffered on an anchor carrier in an access network (AN), transmitting at least one packet and an indicator from the AN on the anchor carrier, and if the at least one packet is buffered on a non-anchor carrier in the AN, transmitting the at least one packet and the indicator from the AN on at least one of the anchor carrier or the non-anchor carrier. Here, the indicator can be set to '0' for the non-anchor carrier to maintain ceased transmission of the CQI or can be set to '1' for the non-anchor carrier(s) to begin CQI transmission.

In another aspect of the present invention, a method of transmitting information to an access network (AN) in a system having at least one carrier includes receiving at least one packet from the AN at least one carrier, each packet includes an indicator which provides buffer level information, transmitting an acknowledgement (ACK) signal to a received packet from the AN, activating a timer upon transmitting the ACK signal on the at least carrier, and ceasing transmission of the CQI of at least one non-anchor carrier to the AN on the at least one carrier if the buffer level information indicates that there is no more packet to be transmitted to an access terminal (AT) or if the timer expires.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
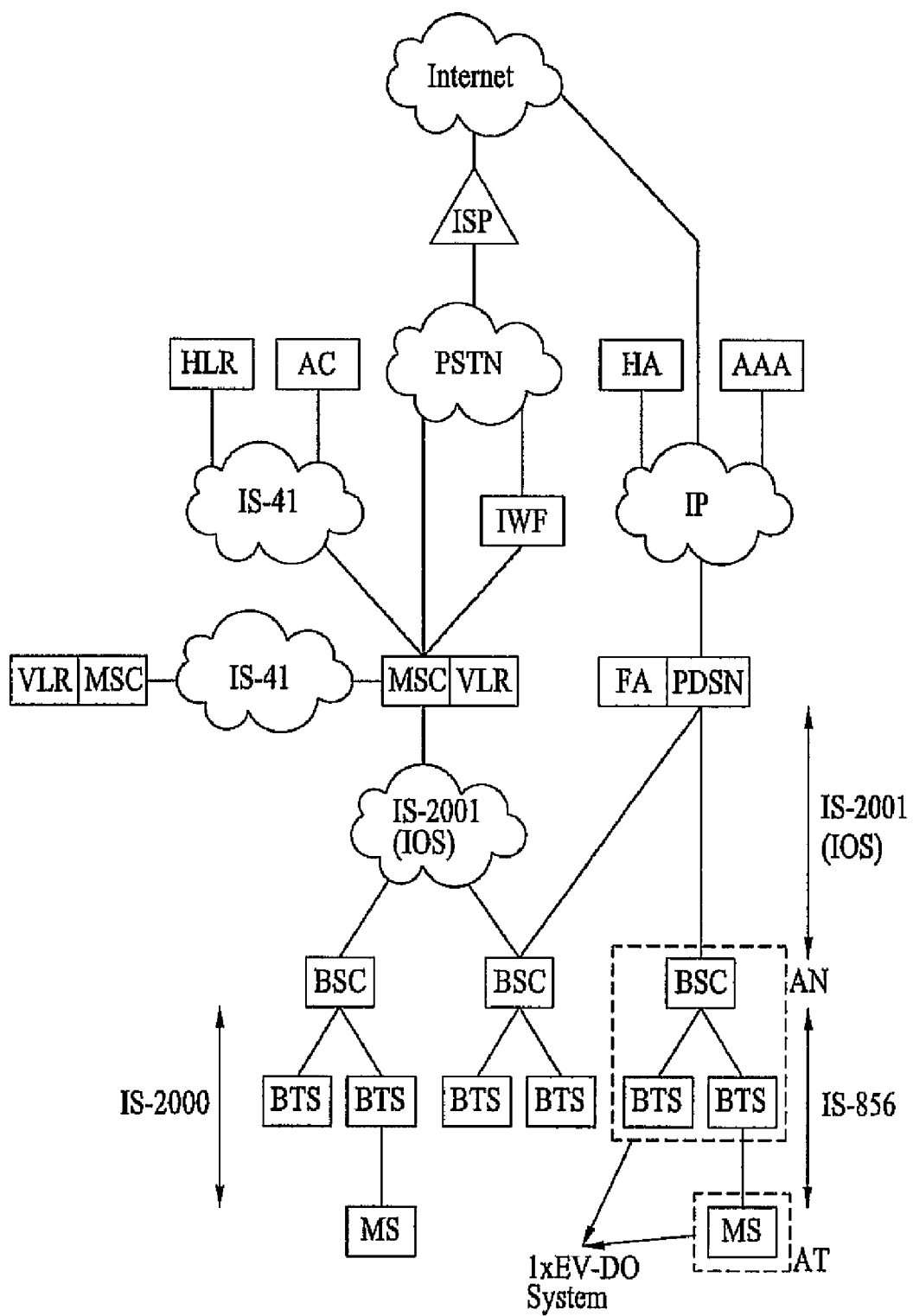
FIG. 1 illustrates a system architecture of 1xEV-DO.
Figure 2:
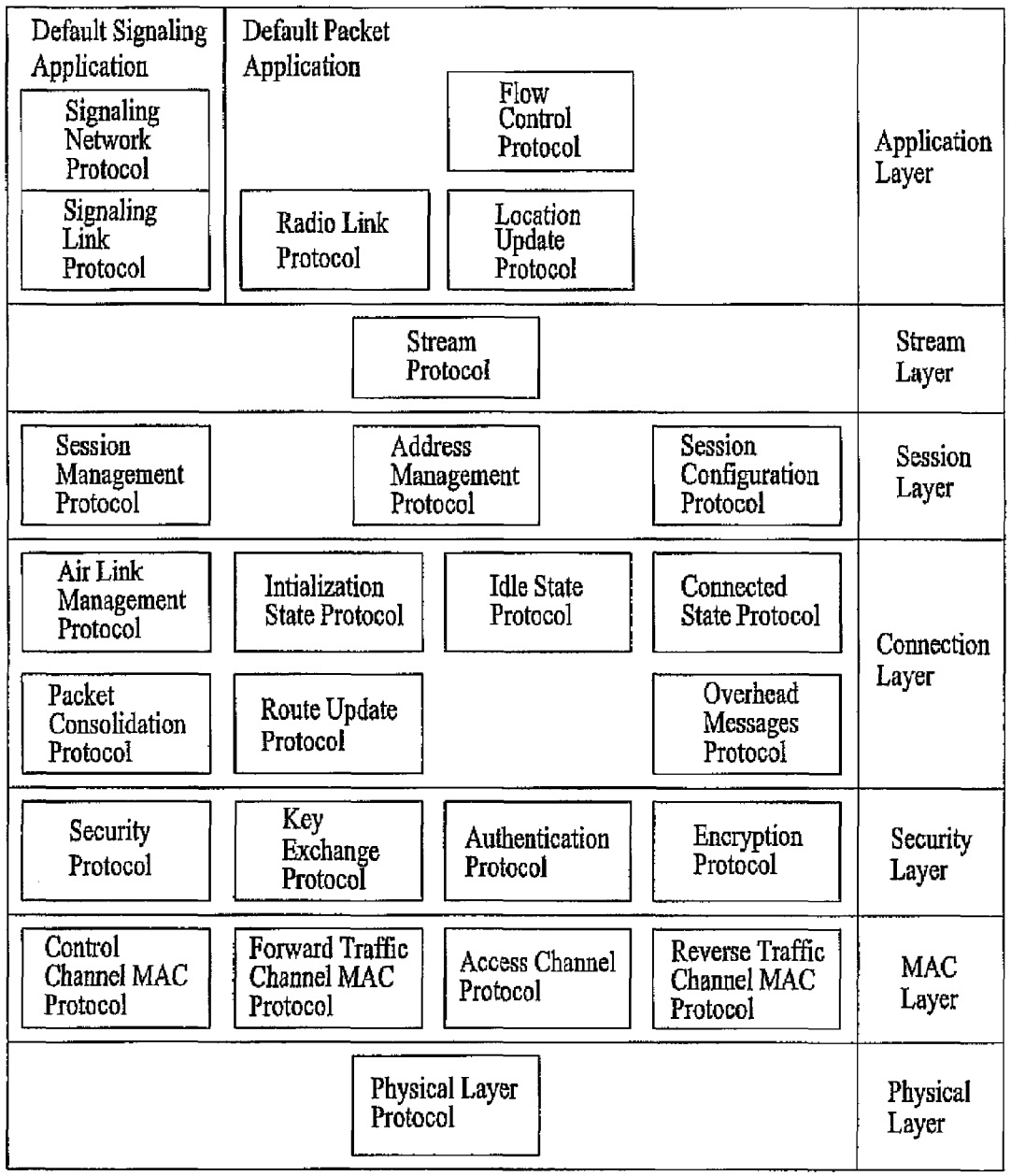
FIG. 2 illustrates a 1xEV-DO default protocol architecture.
Figure 3:
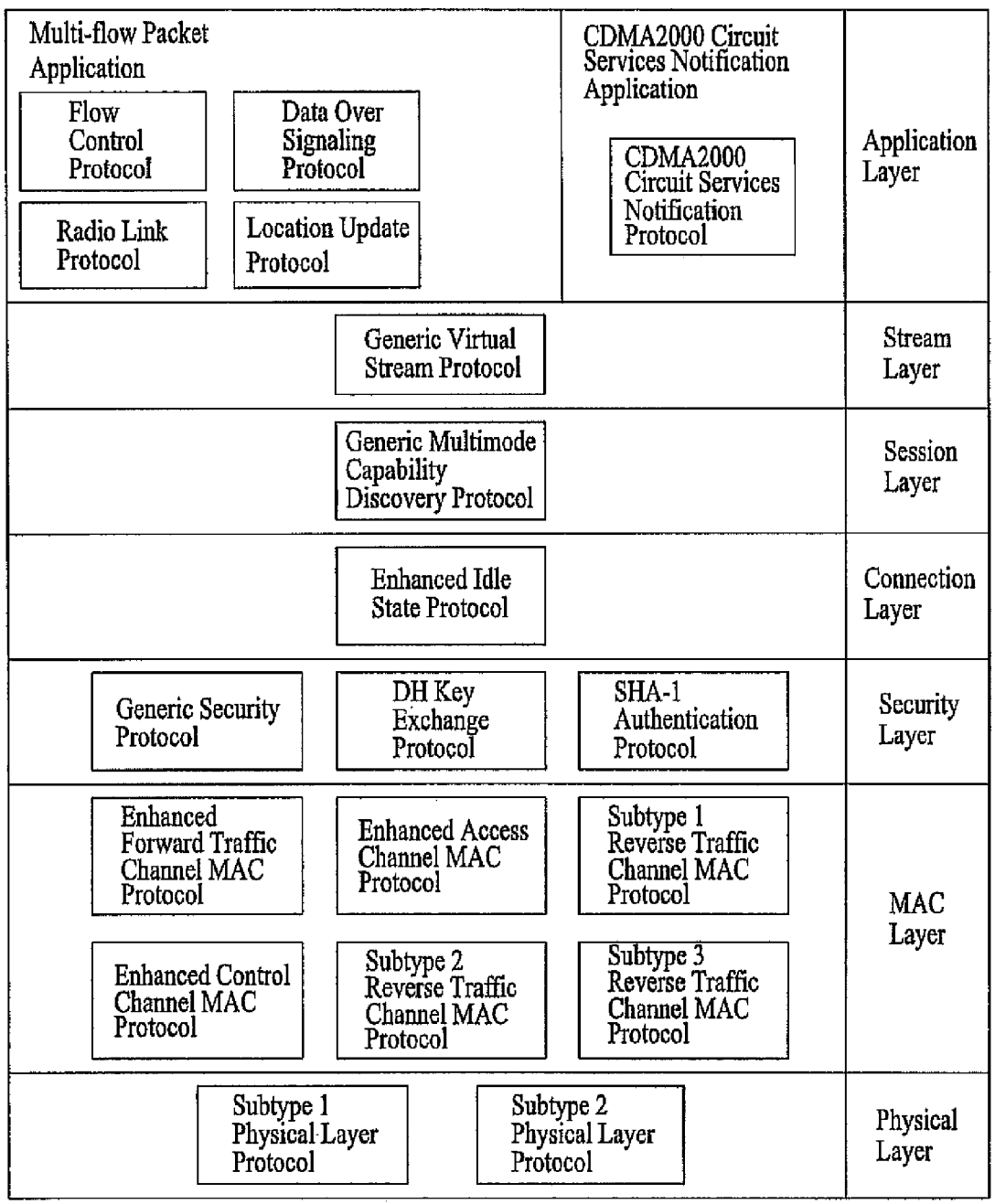
FIG. 3 illustrates a 1xEV-DO non-default protocol architecture.

Reference will now be made in detail to the preferred embodiments of the present invention, examples of which are illustrated in the accompanying drawings. Wherever possible, the same reference numbers will be used throughout the drawings to refer to the same or like parts.

In current systems, which tend to be single-carrier systems, an acceptable amount of overhead and power consumption is often incurred. In a multi-carrier system, it can be expected that significantly greater overhead and power consumption would be incurred per terminal. With increasing demand for more and faster data transmission, similar potential problems can be experienced by most wireless systems, and in particular, $3^{rd}$ Generation Partnership Project (3GPP), 3GPP2, and Orthogonal Frequency Division Multiplexing (OFDM)-based systems.

By reducing signaling overhead in multi-carrier systems, battery consumption can be reduced. That is, by reducing transmit power and/or signal processing requirements at the receiving end, battery consumption can be reduced. Here, signaling overhead refers to channel quality information (CQI) feedback transmitted from an access terminal (AT) to an access network (AN), for example. In addition, reduction of signaling overhead can reduce interference levels, in turn, increasing system capacity.

To this end, reducing signaling overhead can be described in two parts. In Part 1, a shared common signaling scheme from the AN to a scheduled AT is described. In Part 2, buffer level information at the AT for the AN to AT link is described. As such, the descriptions related to the embodiments of the present invention can be applied a communication system having a single carrier as well as a system having multiple carriers.

In Part 1, the AN transmits data packets to the scheduled AT. The scheduled AT refers to an AT which receives designation-specific data packets from the AN. For example, if the data packets are designated for AT#3, the AN sends these data packets to AT#3 and not to other ATs.

With each data packet transmitted to a scheduled AT, buffer level information can be included or appended to the data packet. In other words, the AN can append information of a number of data packet(s) in a queue for the scheduled AT and transmit this information with the data packet to the scheduled AT. Here, the number of data packets in the queue or the buffer level information refers to a number of data packets which are to be delivered to the scheduled AT by the AN. The buffer level information can also be referred to as buffer status information.

There are a number of ways for conveying the buffer level/status information to the AT. In detail, transmission of the buffer level information from the AN to the AT can be accomplished using a single bit. The single bit can be used as an indicator to indicate whether the buffer for the scheduled AT is empty or not empty. Empty buffer means that there is no data packets to be sent to the scheduled AT. Alternatively, non-empty buffers means that there is at least one data packet to be transmitted to the scheduled AT.

The single bit for indicating the buffer level information can be referred to as a last packet indicator (LPI) which applies to data packets or non-anchor carriers. The non-anchor carrier is a carrier which carries data packets. The LPI is attached or appended to each forward link (FL) data packet transmitted to the scheduled AT. For example, the LPI can be represented by either '0' or '1' to indicate empty or not empty status of the buffer, respectively. Here, the LPI of '0' (i.e., LPI=0) indicates that there are no more data packets for the scheduled AT on this particular non-anchor carrier. Alternatively, the LPI of '1' (i.e., LPI=1) indicates that there are still more packets on this particular non-anchor carrier for the scheduled AT. By using at least two (2) bits, the granularity of the buffer level quantization can be generalized to include fine or coarse quantization. Furthermore, by using a single bit, signaling overhead can be minimized.

Alternatively, the LPI can be represented by 2 or more bits. For example, if 2 bits are used, these 2 bits can be used to denote four buffer levels, namely, empty, between empty and quarter full, between quarter full and half full, or between half full and full. Here, the number of packets in a full buffer can be configured and determined at start-up.

Alternatively, in order to save transmission power for the AN and reduce inter-cell interference, LPI information can be transmitted using ON-OFF Keying. For example, 'ON' could indicate LPI=TRUE where as 'OFF' could indicate LPI=FALSE.

Further, the buffer level information represented by the LPI can be made into a command. For example, if using a single bit, LPI=0 commands the scheduled AT to discontinue or cease transmission of the CQI since there are no more data packets for the scheduled AT and for the particular carrier on which the LPI was transmitted.

Using the LPI, single bit, or multiple bits to notify the scheduled AT that there are no more data packets in the buffer can be interpreted as an indication to de-activate the CQI transmission or CQI reporting on non-anchor carriers. Here, de-activation can indicate to the AT to transmit the CQI for a minimum number of forward link (FL) channels (e.g., 1). Conversely, activation can indicate to the AT to transmit the CQIs for the maximum number of configured FL channels (e.g., 3 channels out of possible 16 channels). Regardless of the minimum number of CQI transmissions on non-anchor carrier, the AT maintains CQI transmission of control packet on an anchor carrier. The details of activation of the CQI transmission will be discussed later.

In Part 2, the scheduled AT sends the CQI to the AN. For example, the CQI can be a data rate control (DRC), transmitted to help the AN to determine the data rate for when scheduling ATs, rate control, and other functions. In High Speed Downlink Packet Access (HSDPA) and 1x Evolution for Data and Voice (1xEV-DV) environments, the CQI represents roughly the received signal-to-noise ratio (SINR) which is measured by the AT.

In current 1xEV-DO systems, the CQI is always transmitted in a continuous or a gated fashion. The idea behind Part 2 is to transmit the CQI only when necessary. As described above, the CQI provides information on condition of a forward link (FL), from AT to AN, and in this information, the DRC can be included.

To transmit the CQI or DRC only when necessary, the buffer level information of Part 1 is applied. More specifically, the scheduled AT can cease transmission of the CQI on non-anchor carriers to the AN after receiving the buffer level information indicating that there are no more data packets for the scheduled AT (e.g., LPI=0) from the AN. Again, here, the non-anchor carriers refer to carriers that are used to carry data packets, and an anchor carrier refers to one of N number of carriers which is used to carry control packet(s). The anchor carrier can also be referred to as a primary carrier or an anchor RL carrier.

As referred to above, the CQI or DRC reporting does not necessarily have to be ceased for all non-anchor carriers. That is, the DRC reporting can be active for a specific number of non-anchor carriers. In other words, the scheduled AT can continue to transmit the CQI on the anchor carrier and/or certain non-anchor carriers. It is imperative that the anchor carrier remains active for the AT so that the AT can continue to monitor at least one FL channel for any FL packets for the AT and to possibly receive a command to activate all non-anchor carriers.

For finer quantization, the buffer level information can be used by the AT to determine a number of the CQI carrier channels. Here, the number of CQI carrier feedback channels can be varied by the AT. That is, in addition to using an anchor carrier, non-anchor carriers can also be used.

When the AN sends the LPI with a last packet indicating that there are no more packets for the AT, which can be interpreted as a command to stop reporting of the CQI over the non-anchor carriers, the AN may need to inform a base station control (BSC) of the AN so that the BSC may, in turn, inform all the sectors in the AT active set to let the other BTSs of the active set to expect to no longer receive the non-anchor CQIs.

In operation, the AT waits until all the LPIs are received from all non-anchor carriers before ceasing or deactivating reception of data packets from the AN (i.e., FL reception) and transmission of the CQI to the AN on all the RL carriers, for example. However, as discussed above, it is important that a FL/RL anchor carrier remains active. That is, since the CQI for the FL carriers are needed to power control forward link control channels including the reverse link power control (RPC) and RL automatic repeat request (ARQ) ACK channels (carrying ACKs or NACKs) for the AT, the CQI reporting to the AN should not be discontinued.

If all the RPC and acknowledgement (ACK) channels for each RL channel is carried on a single carrier 'x,' then only one CQI is needed. This means that the CQI for the other carriers can be turned off. As such, there is no need to use the CQI for other carriers to power control the RPC power level and the ACK channel power level. A detailed description of the RPC and ACK channels is as follows.

Assume that there are N number of FL carriers and M number of RL carriers. If the RPC and ACK channels for each RL is carried on a separate FL carrier and N=M, then none of the CQI's can be turned off. If the RPC and ACK channels for each RL is carried on a separate FL carrier and N>M, then N number of CQIs are needed normally but only M number of RPCs and ACK channels need power control. The minimum number of carriers for which CQI must be reported is M. If the RPC and ACK channels for each RL is carried on a separate FL carrier, N<M, and all N number of FL carriers carry RL RPC and ARQ channels for the AT, then none of the CQIs can be turned off. Here, the CQI can be a DRC.

In addition to using an LPI for CQI transmission de-activation, the AT can implement a timer function to determine whether to continue CQI reporting to the AN. First, a timer can be used to determine whether to continue or cease transmission of the CQI after all LPIs are received for non-anchor carriers. This can be referred to as explicit buffer signaling. Second, a timer can be used to determine LPI based on the last CQI sent or the last packet received. This can be referred to as an implicit buffer signaling. Lastly, a combination of the explicit and the implicit buffer signaling can be implemented.

The following is a discussion of an explicit buffer signaling. When an LPI is received on a particular carrier, the AT maintains an open channel for that particular carrier and can continue to provide the CQI of that particular carrier to the AN using the anchor RL carrier. With insertion of the timer function, a timer (or explicit timer) can be incorporated to allow continued communication between the AT and the AN for a specified duration after all the LPIs are received for the non-anchor carriers. That is, the timer at the AT can be initiated once the LPIs from all the non-anchor carriers are received. This would allow de-activation of the CQI transmissions after the timer has expired. For example, the timer can be set for 40 msec and if no packet is received before the expiration of 40 msecs, the AT can determine that there are no more scheduled packets and cease the CQI reporting. By configuring and implementing a timer, state signaling between a base station control (BSC) of the AN and a base transceiver station (BTS) of the AN can be correctly synchronized first before the AT enters this de-activation mode.

Alternatively, as a discussion of an implicit buffer signaling, the LPI can be determined for a two-state (e.g., empty and not empty buffer level) LPI indication. If a data packet is not received by the AT after configurable time duration (e.g., 200 msec), then the AT can assume that there are no more packets to be sent by the AN, in turn determine that the buffer level is empty (e.g., LPI of '0'). Here, the timer (or implicit timer) is configured by the AT for the specified time duration. At the same time, the AN can have a similar timer to make sure that the states are synchronized between the BSC and the BTS.

In practice, the implicit timer can be initiated after sending the CQI to the AN. If more than one CQI is transmitted to the AN, the timer is reset and restarted after each CQI transmission. Alternatively, the timer can be started after receiving a packet from the AN. If the AT receives more than one packet, the timer is reset and re-started when a subsequent packet is received. In addition, the timer can be initiated after a specified time duration has expired after sending the CQI or after receiving a packet. This means that the operation of the timer can be configured by various means.

Next, the timer functions (i.e., explicit timer and implicit timer) of above can be applied in combination. That is, the explicit timer can be initiated after all the packets are received, and the implicit timer can be initiated after sending the CQI or receiving the packet.

In a multi-carrier system, the BSC of the AN can send packets on a part of the carriers and does not have to utilize all the carriers. In other words, the AN can send packets on M number of carriers out of N carriers, where M<N. For example, the AN can send packets only to three of the four carriers. As such, the carrier without any packets for a particular AT is not able to send an LPI, which is an indicator attached to a FL packet to the AT. Therefore, the AT is unable to initiate an implicit timer since no CQI is reported. In this case, the AT and the AN can set to use implicit signaling. On the other hand, when a packet is sent to the AT on a particular carrier, the implicit timer is disabled and the explicit timer is used. Moreover, an explicit timer at the AT can be initiated after all LPIs from all the active carriers are received. This allows de-activation of the CQI transmission after the timer has expired.

At the AN, a scheduler of the AN can be made aware of the implicit timer so that it would be constrained to send at least one packet to an AT before the expiration of the timer and to initiate the explicit signaling.

Figure 4:
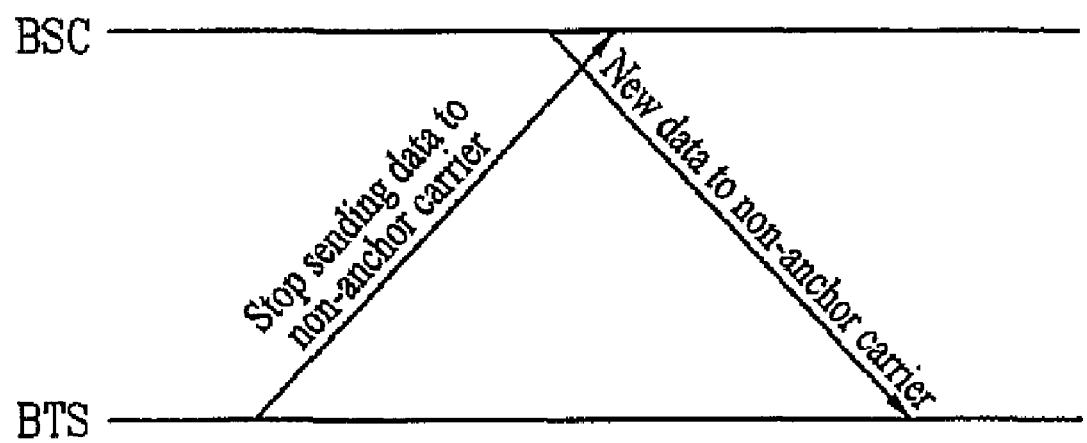
FIG. 4 illustrates a possible problem caused by a round trip delay between the BSC and the BTS.

As discussed above, the AN can have a similar timer to make sure that the states are synchronized between the BSC and the BTS. FIG. 4 illustrates a possible problem caused by a round trip delay between the BSC and the BTS. When there are no more packets for the AT and the timer expires, all DRC transmissions for non-anchor FL carriers are discontinued, and the AT stops monitoring data portion of the non-anchor carrier. At the AN, the BTS sends a notification to stop sending data to non-anchor carrier since the DRC transmission has ceased to the BSC. However, as shown in FIG. 4, if the BSC transmits new data to the non-anchor carrier because it has not yet received the notification from the BTS, then a problem can arise. In order to prevent this time offset or round trip delay, a BTS-BSC timer value can be configured to be larger than the round trip delay between the BTS and the BSC.

If the timer (e.g., explicit timer or implicit timer) is initiated and is expired after configured time duration, as discussed above, the AT stops the CQI transmission to the AN. In this situation, since the AT no longer sends the CQI/DRC, the state of the AT can be said to be in a 'sleep' state. When the timer expires, the BTS of the AN is also aware of the fact that there are no packets buffered for the AT. As such, the BTS sets itself to not expect to receive any CQIs or DRCs (e.g., DRC_on=0).

However, during the sleep state, the BTS can receive packets for the AT. To receive these packets from the AN, the AT has to wake up and terminate the sleep state to receive the packets. The details of how the BTS can wake up the AT will be provided below. After the scheduled AT has completed receiving the scheduled packet(s), the timer is re-started. Alternatively, the timer can be re-started after receipt of each packet from the AN.

In order for the AN to wake up the AT from its sleep state, a wake-up indicator (WUI) or a first packet indicator (FPI) can be designed and sent to the AT to re-start the CQI transmission. As discussed above, the sleep state refers to no transmission of the CQIs since there are no packets to be delivered on the carriers. However, when there are packets to be transmitted by the AN while the AT is in sleep mode, the AN can wakes up or notify the AT that there are packets to be sent This notification is made by the WUI or the FPI.

In detail, the AN sends the WUI to a particular AT. Here, the WUI can be sent on the anchor carrier or the non-anchor carrier. As discussed above, the anchor carrier is always connected, whereas the non-anchor carriers are not. However, for the purpose of delivering the WUI, either carrier type can be used.

As a method of indicating the WUI, a LPI can be used. In other words, the signaling of the WUI can be done in a variety of ways. First, the signaling can be executed using a two-state bit indicating either LPI or WUI. For example, a bit of '0' could be used to represent the LPI, and a bit of '1' could be used to represent the WUI. Alternatively, a separate bit for signaling WUI can be used. Here, the bit indicating either the LPI or the WUI is appended to a packet scheduled to a target AT.

More specifically, when the AT receives the LPI on an anchor carrier, the AT can interpret the LPI as WUI and sets the CQI reporting to continue on all non-anchor carriers (DRC_on=1). Thereafter, the AT can start transmitting the CQI (or DRC) on all non-anchor carriers At the same time, the AN sets (DRC_on=1) to receive the CQI reporting on all non-anchor carriers.

Alternatively, without a packet to send to the AT, the LPI cannot be sent. However, this problem can be resolved by sending a dummy packet to the AT using a multi-user packet format in order to make the AT start transmitting the CQI before transmitting real new packets. The details of the multi-user packet (MUP) format will be discussed later. The AT always monitors pilot/MAC portion on all assigned carriers even though the AT stops transmitting the CQI on certain or all non-anchor carriers. When the AT receives a dummy packet with the LPI attached thereto from on the non-anchor carrier, the AT discards the dummy packet and sets the CQI reporting to continue on all non-anchor carriers (DRC_on=1). At the same time, the AN sets (DRC_on=1) to receive the CQI reporting on all non-anchor carriers.

Furthermore, the LPI or the WUI can be transmitted over a null-rate packet. This transmission over the null-rate packet can be for signaling purposes. The AN can use the null-rate packet to indicate that the AT should wake up and begin transmitting the CQIs. Alternatively, the AN can use a separate signal to indicate that the AT should activate the CQI transmission. For example, this could be done by sending a DRC_LOCK_ON/OFF signal over a configured number of consecutive or non-consecutive transmissions from all sectors in the AT active set.

It is possible to have each carrier indicate to some central processing unit when the WUI (or LPI) is sent. This central processing unit can act as a contact point for the BSC of the AN.

In addition, the AN can send an activate indicator (ACTI) to the AT. The ACTI applies to an anchor carrier. Moreover, the ACTI can be represented using one (1) bit. For example, if the ACTI is represented by '1' (i.e., ACTI=1) on an anchor carrier, this indicates that all non-anchor carriers are to be activated or waken up. That is, the AN commands the AT to activate the non-anchor carriers since there are data packets for the AT. On the other hand, if the ACTI is represented by '0' (i.e., ACTI=0) on an anchor carrier, this indicates that the non-anchor carriers should remain de-activated since there are no scheduled data packets for the AT.

If data for AT is received at the buffer of the anchor carrier by the BTS of the AN when the CQI (or DRC) is not being reported (e.g., DRC_on=0), the BTS follows an instruction from the BSC of the AN to either send packets on the anchor carrier with ACTI=0 or send packets on the anchor carrier with ACTI=1, thus activating all non-anchor carriers.

Alternatively, if newly arrived data for AT is received at the buffer of a non-anchor carrier by BTS when the CQI (or DRC) is not being reported (e.g., DRC_on=0), then the AN tries to send a packet on the non-anchor carrier if the CQI/DRC is still reported on the non-anchor carrier. However, if the CQI/DRC is not reported for the non-anchor carrier and there are packets for the AT buffered at the anchor carrier, then the AN sends a packet on the anchor carrier with ACTI=1, thus activating all non-anchor carriers. Here, initially, all non-anchor FL carriers cannot transmit packet to the AT since there are no DRCs for them. The AT only listens to the anchor carrier. By sending a packet with ACTI=1 on the anchor carrier to the AT, the AT realizes that it is time to start reporting the DRCs for other non-anchor carriers. Hence, the AN can start transmitting packets on the non-anchor carriers.

If activation of CQI/DRC reporting is selected, the BTS sets activation to begin receiving the CQI/DRC from the AT. After the BTS of the AN has set activation and the first packet can be transmitted by the AN, the AN can add all non-anchor FL carries to the set of carriers for which DRCLock value is determined. Here, DRCLock represents the quality of the DRC. A timer, which serves as an implicit LPI, for each non-anchor carrier, except for the one which sent the packet is started. Within the AN, the BTS sends a message to the BSC to inform that it is ready to receive data on all non-anchor carriers. After the AN sends a packet on the non-anchor carrier, the implicit LPI timer, associated with the carrier and the AT, can be stopped. If the explicit LPI is used, the timer should not be restarted. Lastly, if the implicit LPI timer is active and there is FL packets buffered, the scheduler of the carrier can schedule one of the packets before the timer expires.

If a packet is received on a non-anchor carrier or on an anchor carrier with ACTI=1 when the CQI reporting is deactivated, the AT can configure to start CQI/DRC reporting to the AN. Thereafter, the AT starts reporting DRCs for all non-anchor carriers, and at the same time, a timer for each non-anchor carrier, which serves as an implicit LPI, is can be started. If the BST-BSC timer of the AN is active at this time, the timer can be turned-off.

Further, the ACTI can be represented by more than a single bit. The ACTI of two (2) bits, for example, can be used to notify the AT to activate a part of the non-anchor carriers. For example, the ACTI of 2 bits denotes four levels, and as such, one of the levels can command the AT to activate a half of the non-anchor carriers while another level can command the AT to activate three quarters of the non-anchor carriers. Based on the number of bits used to represent the ACTI, the command from the AN to the AT can be more specific.

Following is a description of a single-user packet and a multi-user packet. Since the LPI and the ACTI can be sent using same mechanism, the following description will be made using the LPI.

With respect to a single-user packet a Walsh code, having a length of 128, can be reserved for transmitting the LPI to an AT for a carrier which does not carry an RPC and RL ARQ channels for the AT. Here, the Walsh code is not used for a medium access channel (MAC) multiplexing (e.g., MAC index 67, $W^{128}_{97}$). When a FL packet is sent and there is no data buffered for the AT on this particular carrier, the LPI indication bit can be sent on RPC/RL ARQ channel of the carrier covered with the Walsh code associated with the reserved MAC index. After the packet is sent and there is no data in the buffer for the AT on the carrier, the AN can set de-activation CQI/DRC transmission from the AT. For example, the AN can set $DRC_{off}=1$ to indicate that there are no more CQI or DRC reporting from the AT. After the AT receives the packet with the LPI, the AT sets $DRC_{off}=1$.

Figure 5:
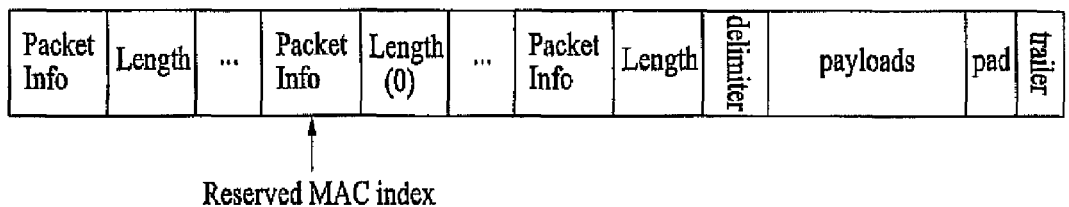
FIG. 5 illustrates a configuration of a multi-user packet (MUP) having a PacketInfo field of a reserved MAC index and a length (0) field.

With respect of a multi-user packet (MUP), the AN places a PacketInfo field and length fields of the ATs, having the last packet in this MUP, at the beginning of the packet header section. Alternatively, the AN places PacketInfo fields and length fields of the AT, having more packets to deliver in this MUP, at the end of the packet header section. The fields associated with the last packet and more packets are separated by a PacketInfo field of a reserved MAC index and a length (0) field. The length (0) field indicates a demarcation point. That is, when the AT's PacketInfo is located before the length (0) field, then the LPI is indicated. Alternatively, when the AT's PacketInfo is located after the length (0) field, then this indicates that there are still more packets to be sent, and the LPI is not indicated. FIG. 5 illustrates a configuration of a multi-user packet (MUP) having a PacketInfo field of a reserved MAC index and a length (0) field. In the packet, LPI for several ATs may be included.

Figure 6:
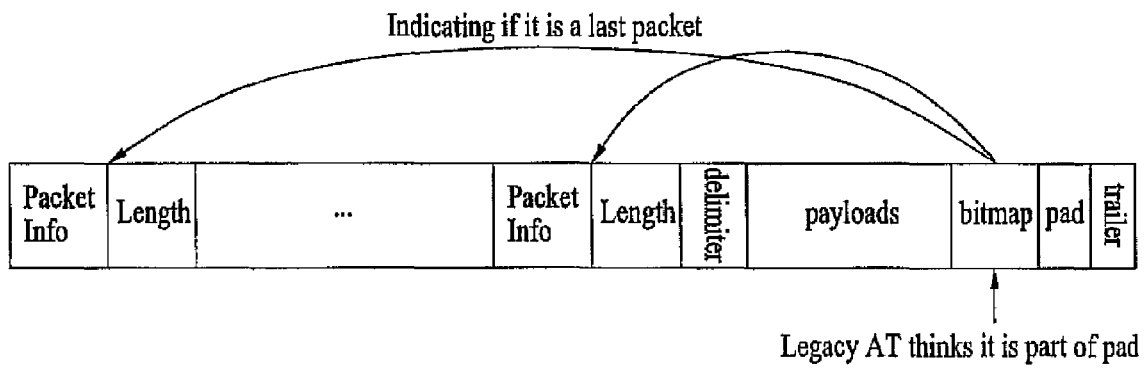
FIG. 6 shows another configuration for LPI in a MUP.

FIG. 6 shows another configuration for LPI in a MUP. In this figure, a bitmap is appended at the end of the payloads to indicate which packet inside the MUP is a last packet. This location of the bitmap causes a legacy AT to believe that the bitmap is part of a pad field. In addition, a bit covered by the reserved MAC index sent on RPC/RL ARQ channel can be used to indicate if the LPI map is included in the MUP.

It is possible for the AT to stop reporting the CQI or DRC for non-anchor carriers while the AN still has packets to send. This could occur, for example, when the LPI is falsely detected for the last carrier with packets. In this situation, the last carrier still needs to send packet(s) to the AT but the CQI for the last carrier is no longer available.

Here, if the AT stops reporting the DRC for non-anchor carriers (e.g., DRC_on=0) but the AN still has packets to send (e.g., DRC_on=1), the AN may use the packet sent to the AT on anchor carriers with a ACTI=1 to inform the AT to resume reporting the DRC for non-anchor carriers.

Alternatively, the DRCLock channel on the anchor carrier can also be used to avoid the above situation. If the AT observes DRCLock for a specified period (e.g., three consecutive reports), the AT can set to report DRCs (e.g. DRC_on=1) for all non-anchor FL carriers. The AT then can begin reporting the DRCs for all non-anchor carriers.

On the contrary, the AT may still think that there are packets to receive when the AN actually has no packets to send. This is possible if an LPI were missed. Here, the communication system can still function, but the AT cannot take advantage of the savings from gating the non-anchor DRCs. To correct the misinterpretation by the AT, the AN can include a PacketInfo field of the AT and a length field with value zero in a MUP, as shown in FIGS. 5 and 6, to signal the LPI without sending a packet to the AT. Here, the MUP is intended for other ATs but includes this particular AT as one of its recipients. This serves as a back-up LPI. Thereafter, the AT follows the normal procedure to discontinue the DRC for the carrier the MUP is sent on. As for the AN, the AN usually knows whether the AT is transmitting the DRC or not because there is an algorithm for generating the DRCLock. Here, the AN accumulates the DRC channel energy for several slots (i.e., DRCLength) and determines whether a valid DRC is received based on the amount of energy it receives on the AT's DRC channel.

In the discussion of above, the AN transmits the LPI with the last packet to indicate that there are no more packets to follow. Alternatively, the AT can also send a RL LPI to notify the AN that there will be no more reverse link transmission following the last packet. With this notification, the AT does not need to continuously send null rate RRI after the last packet has been sent. As such, the AN does not need to decode the RRI as well as the RL data. In turn, battery power can be conserved at the AT.

In the discussion of above, the AT can also be referred to as a mobile station, a mobile subscriber station, a terminal, a mobile terminal, and a like. Further, the AN can also be referred to as a node, a base station, a base subscriber station, a base terminal, a base terminal station, and a like.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting channel quality information (CQI) from an access terminal (AT) to an access network (AN) in a system having at least one carrier, the method comprising:

receiving at least one packet from the AN, wherein each of the at least one packet includes an indicator providing buffer level information;

ceasing transmission of CQI on at least one non-anchor carrier to the AN when the buffer level information indicates that there are no more packets to be transmitted to the AT, wherein the AT continues to transmit CQI on at least one anchor carrier to the AN;

receiving an activate indicator on the at least one anchor carrier when the buffer level information indicates that there is at least one packet to be transmitted to the AT, wherein the activate indicator commands the AT to activate the at least one non-anchor carrier; and starting transmission of the CQI on the at least one non-anchor carrier to the AN, wherein the at least one non-anchor carrier transmits a data packet and the at least one anchor carrier transmits a control packet.

2. The method of claim 1, wherein the buffer level information is represented by 1 bit.

3. The method of claim 2, wherein the 1 bit indicates that either there are no more packets to be transmitted to the AT or there are more packets to be transmitted to the AT.

4. The method of claim 1, wherein the buffer level information is represented by at least 2 bits.

5. The method of claim 4, wherein the at least 2 bits denotes a number of buffer levels corresponding to the number of bits represented.

6. The method of claim 5, wherein a number of CQI carrier feedback channels to be used is determined by the AT based on the number of buffer levels.

7. The method of claim 1, wherein the indicator is a last packet indicator (LPI) which indicates a buffer level for the AT.

8. The method of claim 7, wherein the buffer level represents whether there are no more packets to be transmitted to the AT or there are more packets to be transmitted to the AT.

9. The method of claim 7, wherein the LPI is included in a header portion of the packet in a multi-user packet.

10. The method of claim 7, wherein the LPI is appended at the end of a payload in a multi-user packet.

11. The method of claim 7, wherein the LPI is in a bitmap format.

12. The method of claim 7, wherein the LPI is a command.

13. The method of claim 1, wherein the CQI represents a signal-to-noise ratio measured by the AT.

14. The method of claim 1, wherein the CQI includes data rate control (DRC) information.

15. A method of transmitting information from an access terminal (AT) to an access network (AN) in a system having at least one cater, the method comprising:

transmitting an acknowledgement (ACK) signal in response to a received packet from the AN;

activating a timer upon transmitting the ACK signal to the AN;

ceasing transmission of channel quality information (CQI) on at least one non-anchor carrier when the timer expires, wherein the AT continues to transmit CQI on at least one anchor cater to the AN;

receiving an activate indicator on the at least one anchor carrier when buffer level information at the AN indicates that there is at least one packet to be transmitted to the AT, wherein the activate indicator commands the AT to activate the at least one non-anchor carrier; and starting transmission of the CQI on the at least one non-anchor carrier to the AN, wherein the at least one non-anchor carrier transmits a data packet and the at least one anchor carrier transmits a control packet.

16. The method of claim 15, wherein the CQI includes a data rate control (DRC).

17. A method of transmitting information from an access terminal (AT) to an access network (AN) in a system having at least one carrier, the method comprising:

receiving at least one packet from the AN on at least one carrier, wherein each of the at least one packet includes an indicator which provides buffer level information;

transmitting an acknowledgement (ACK) signal in response to a received packet from the AN;

activating a timer upon transmitting the ACK signal on the at least one carrier;

ceasing transmission of channel quality information (CQI) on at least one non-anchor carrier to the AN when the buffer level information indicates that there are no more packets to be transmitted to the AT or when the timer expires, wherein the AT continues to transmit CQI on at least one anchor cater to the AN;

receiving an activate indicator on the at least one anchor carrier when the buffer level information indicates that there is at least one packet to be transmitted to the AT, wherein the activate indicator commands the AT to activate the at least one non-anchor carrier; and starting transmission of the CQI on the at least one non-anchor carrier to the AN, wherein the at least one non-anchor carrier transmits a data packet and the at least one anchor carrier transmits a control packet.

* * * * *